United States Patent
Tetzlaff et al.

(10) Patent No.: US 8,582,226 B2
(45) Date of Patent: Nov. 12, 2013

(54) WRITE DELAY STABILIZATION

(75) Inventors: David Erich Tetzlaff, Minnetonka, MN (US); Bruce Douglas Buch, Westborough, MA (US)

(73) Assignee: Seagate Technology LLC, Cupertino, CA (US)

( * ) Notice: Subject to any disclaimer, the term of this patent is extended or adjusted under 35 U.S.C. 154(b) by 120 days.

(21) Appl. No.: 13/421,547

(22) Filed: Mar. 15, 2012

(65) Prior Publication Data

US 2013/0242428 A1 Sep. 19, 2013

(51) Int. Cl.
*G11B 5/02* (2006.01)
(52) U.S. Cl.
USPC .............. 360/68; 360/61; 360/62; 360/46
(58) Field of Classification Search
None
See application file for complete search history.

(56) References Cited

U.S. PATENT DOCUMENTS

| | | | |
|---|---|---|---|
| 5,634,014 A | 5/1997 | Gist et al. | |
| 7,088,532 B1 | 8/2006 | Krajnovich et al. | |
| 7,834,667 B1 | 11/2010 | Wong | |
| 2010/0246048 A1* | 9/2010 | Ranmuthu | 360/68 |
| 2011/0084681 A1 | 4/2011 | Herbst | |
| 2011/0128778 A1 | 6/2011 | Chen et al. | |
| 2012/0014011 A1* | 1/2012 | Wilson | 360/39 |

* cited by examiner

*Primary Examiner* — Muhammad N Edun
(74) *Attorney, Agent, or Firm* — Hall Estill Attorneys at Law (57) ABSTRACT

Apparatus and method for write delay stabilization. A write driver is adapted to output bipolar write currents to write data to a memory. A preconditioning circuit is adapted to output first and second thermal preconditioning currents through the write driver to stabilize a write delay associated with the write driver to a steady-state level prior to the writing of data to the memory.

20 Claims, 5 Drawing Sheets

WRITE DELAY STABILIZATION

SUMMARY

Various embodiments of the present invention are generally directed to an apparatus and method for stabilizing write delay in a data recording system.

In accordance with some embodiments, a write driver is adapted to output bipolar write currents to write data to a memory. A preconditioning circuit is adapted to output first and second thermal preconditioning currents along non-overlapping paths through the write driver to stabilize a write delay associated with the write driver to a steady-state level prior to the writing of data to the memory.

These and other features and advantages which may characterize various embodiments can be understood in view of the following detailed discussion and the accompanying drawings.

DETAILED DESCRIPTION

The present disclosure generally relates to data storage, and more particularly to an apparatus and method for enhancing write delay stability in a data storage system.

Data storage devices are used to store and retrieve digital data in a fast and efficient manner. Some data storage devices utilize a read/write data transducer to write data to and read data from a rotatable data storage medium. The data may be stored along concentric tracks defined on a recording surface of the medium.

A bit-patterned medium (BPM) is a type of recordable data storage memory in which discrete cells, or dots, of recordable material are prearranged in an arrayed pattern on the recording surface. The cells store data responsive to operation of the transducer, such as via magnetic recording in which a magnetic field is imparted to the media, or optical recording in which a light beam is imparted to the media. Heat assisted magnetic recording (HAMR) techniques may also be used to facilitate the data recording process.

It is common to use a read element of the data transducer to extract control information from the rotating medium as various control fields pass adjacent the transducer. Position control information can be used to position a write element of the transducer at a desired radial location on the medium (e.g., on a selected track). Timing information can be used to enable the write element to write data to a desired angular location on the medium (e.g., to a selected data sector along the selected track) at a desired write frequency.

A continuing trend in the industry is to provide data storage media with ever higher data storage areal densities. While advantageously increasing the overall data capacities of such devices, a higher data storage density generally tends to reduce the available timing margin in ensuring that the write element initiates the writing of data at the appropriate point on the associated medium.

Accordingly, various embodiments disclosed herein are generally directed to improving write synchronization between a write element and an associated medium. As explained below, a driver circuit is adapted to apply bipolar write currents to a write element during a data write operation. The driver circuit is thermally preconditioned by a preconditioning circuit which supplies preconditioning currents through the driver circuit between write operations. The preconditioning currents do not pass to the write element, and serve to stabilize write delays during the subsequent write operations.

Figure 1:
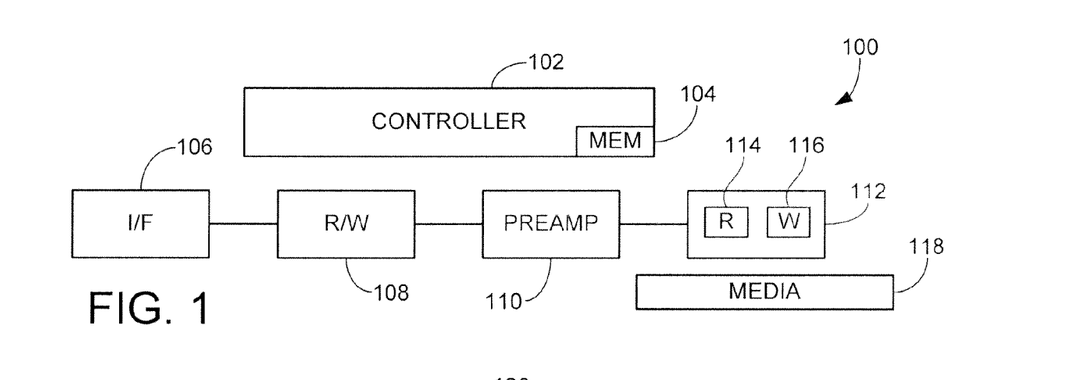
FIG. 1 illustrates a data storage device in accordance with some embodiments.

These and other features of various embodiments can be understood beginning with a review of FIG. 1, which provides a functional block diagram of a data storage device 100. The device can take any variety of forms. For purposes of the present discussion, it will be contemplated that the device is a hard disc drive (HDD) that stores data to one or more rotatable magnetic recording media.

A controller 102 provides top level control for the device. The controller may be characterized as a hardware or firmware based programmable processor that uses programming and/or control data stored in an associated controller memory (mem) 104. An interface (I/F) circuit 106 communicates with a host device (not separately shown), and provides data buffering and post processing capabilities (e.g., error detection and correction, etc.). A read/write (R/W) circuit 108 conditions received writeback data from the host for storage during a write operation, and reconstructs recovered data to be retrieved to the host during a read operation.

A preamplifier/driver (preamp) circuit 110 provides signal conditioning and driving capabilities for a data transducer 112. The data transducer includes separate read (R) and write (W) elements 114, 116 configured to transduce data with a rotatable magnetic medium 118. While not limiting, it is contemplated that the read element 114 takes a magneto-resistive (MR) construction, and the write element 116 takes a perpendicular recording construction with or without heat assist and fly height adjustment capabilities. The preamp 110 supplies relatively large magnitude, high frequency bipolar write currents to the write element 116, and relatively low magnitude, low frequency read bias currents to the read element 114.

Figure 2:
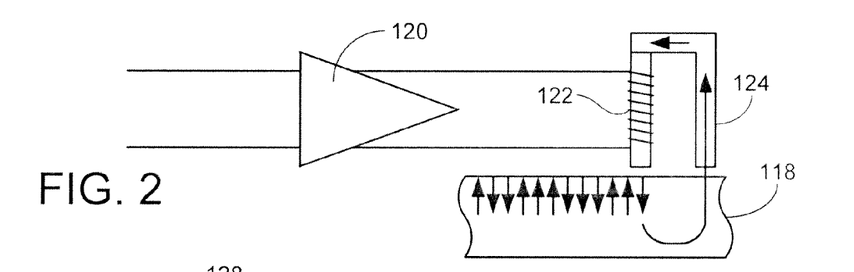
FIG. 2 shows a write driver in conjunction with a write element and an adjacent storage medium that may be utilized in the data storage device of FIG. 1.

FIG. 2 illustrates portions of the preamp 110, write element 116 and medium 118 in accordance with some embodiments. A write driver 120 of the preamp 110 is configured to output bipolar write currents to a coil 122 of the write element 116. The write currents may take a non-return to zero (NRZI) format with transitions corresponding to a selected write clock frequency. Responsive to the polarity of the write currents, the coil 122 cooperates with a magnetic core (pole) structure 124 to direct controlled magnetic fields into a recording layer of the medium 118. A return path for the write magnetic loop may be established through a return layer of the medium and a return pole of the pole structure 124 as shown.

Figure 3:
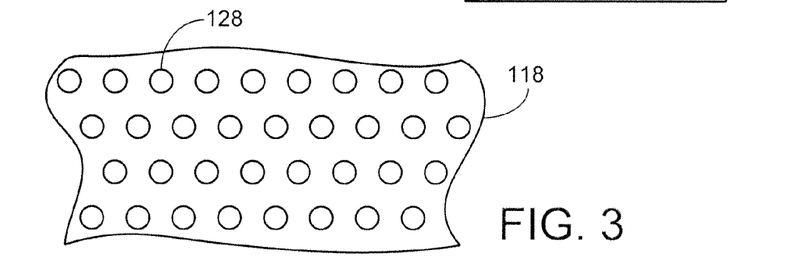
FIG. 3 shows an exemplary configuration for a bit patterned medium (BPM).

While not limiting, the magnetic medium 118 of FIGS. 1-2 may take the form of bit patterned media (BPM), as generally represented in FIG. 3. BPM are specially processed media subjected to suitable lithography steps during manufacture to define an array of discrete, magnetically responsive recordable cells, or dots 128 that store individual bits of data.

Figure 4:
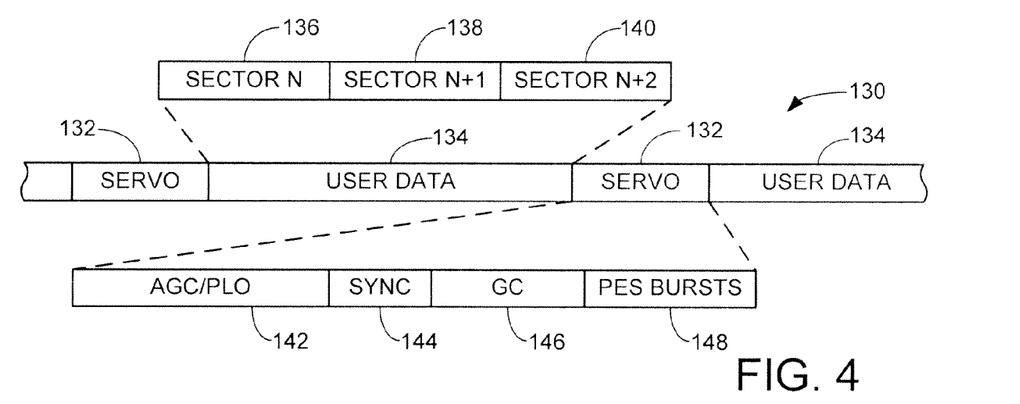
FIG. 4 is a functional representation of an exemplary format for data on a medium such as in FIGS. 1-3.

It is contemplated that the recording surface(s) of the medium 118 are arranged in the form of concentric data tracks. One exemplary format for a track 130 is represented in FIG. 4. It will be appreciated that any number of formats can be used, so that FIG. 4 is merely for purposes of providing an illustrative example and is not limiting.

The exemplary track 130 includes a succession of spaced apart servo control fields 132, with user data fields 134 interspersed between each pair of the servo fields 132 along the track. In some embodiments, the user data fields 134 may include a number of fixed size user data sectors such as sectors 136, 138 and 140 (denoted as Sectors N, N+1, N+2 . . . ). Each sector may store a fixed amount of encoded user data (e.g. 512 B etc.).

Each servo field 132 may include servo control, timing, header and other types of control data useful in assisting the storage device 100 in correctly positioning the read and write elements 114, 116 during read and write operations upon the data sectors. Exemplary fields shown in FIG. 4 include an automatic gain control and phase lock oscillator (AGC/PLO) field 142, a synchronization (sync) field 144, a Gray code (GC) field 146 and a position error signal (PES) bursts field 148.

Generally, the AGC/PLO field 142 provides an oscillating pattern (such as a 2T pattern) to enable the readback system to provide both amplitude and phase synchronization with the medium. The sync field 144 provides a unique bit pattern to enable the readback system to detect the commencement of the remaining servo information. The GC field 146 indicates radial position (e.g., track address/increment). The PES field 148 provides dibit patterns for intra-track positional control. Other formats and types of control information may be provided as well, including index (angular position) fields, etc.

Figure 5:
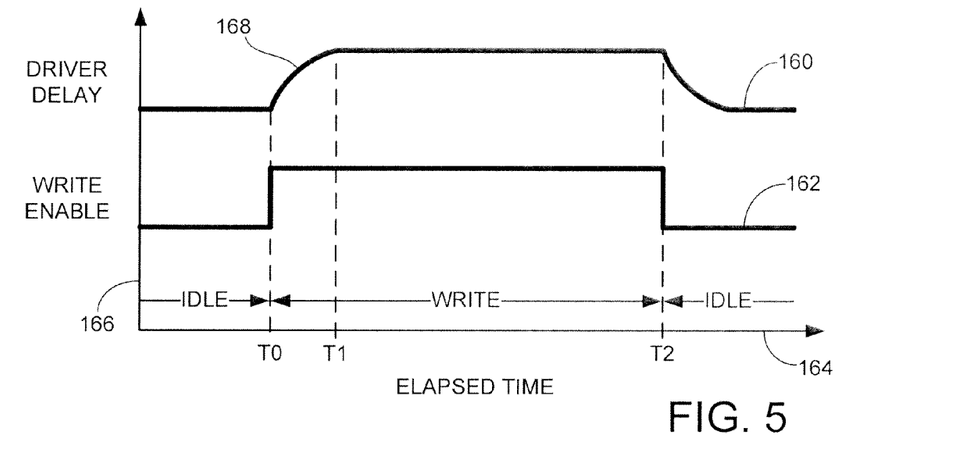
FIG. 5 is a timing diagram illustrative of exemplary write delay that may be experienced during a write operation by the device of FIG. 1.

FIG. 5 is a graphical representation of timing information relating to the operation of the exemplary device 100. FIG. 5 includes a driver delay curve 160 and a write enable curve 162. The curves 160, 162 are plotted against an elapsed time x-axis 164 and a common amplitude y-axis 166. The write enable curve 162 represents a write enable signal that is output to the preamp 110 (FIG. 1) to enable the writing of data by the write element 122 (FIG. 2). Writing is enabled at T0 and disabled at time T2. The actual writing of data takes place as required during this interval.

The driver delay curve 160 generally represents write delay characteristics of the write driver and write element depicted in FIG. 2. Such write delay generally relates to the elapsed time between the presentation of a write input bit to the write driver 120, and the outputting of a corresponding magnetic write pulse by the write element 116 to the medium 118 to write the input bit. While this delay is relatively small and may be measured in nanoseconds or less, it has been found to be is neither negligible nor constant. Factors that contribute to write delay include electronic offsets, conductor length, gate delays, conductor resistance, and capacitive/inductive parasitic effects.

The write delay represented by curve 160 in FIG. 5 can be highly temperature dependent. The write delay shown in FIG. 5 is initially relatively low when the associated components are at a cooler ambient temperature. Due to various factors, most notably heating, the write delay will tend to increase until a nominally steady-state delay amount is reached as indicated at time T1. This transition to steady-state is represented by leading edge segment 168 in curve 160. While this transition is shown to be largely exponential in nature, other delay variation transition characteristics can be encountered. It will be appreciated that the write delay may instead decrease as temperature increases, depending on the configuration of the system.

The sensitivity of the preamp write driver circuit 120 to temperature can adversely impact the writing of data to the medium 118. For example, if the timing of the write operation is based on an expectation of the steady state delay value, changes in the amount of write delay during the writing of a particular sequence of data may alter the effective write frequency and/or phase of the written data over the course of the write, and may shift the timing of the write data transitions along the medium relative to the ideal positions of the bits.

While write delay variations can adversely affect the writing of data to a number of different types of recording media, such delays are of particular concern in the case of bit patterned media. This is because BPM recording generally requires precise synchronization of the timing of write data pulses at the write pole 124 with the arrival of individual bit cells 128 at the pole. Changes in write delay can thus induce a misalignment of the write pulses and the bit cells, leading to a degradation or loss of data.

Figure 6:
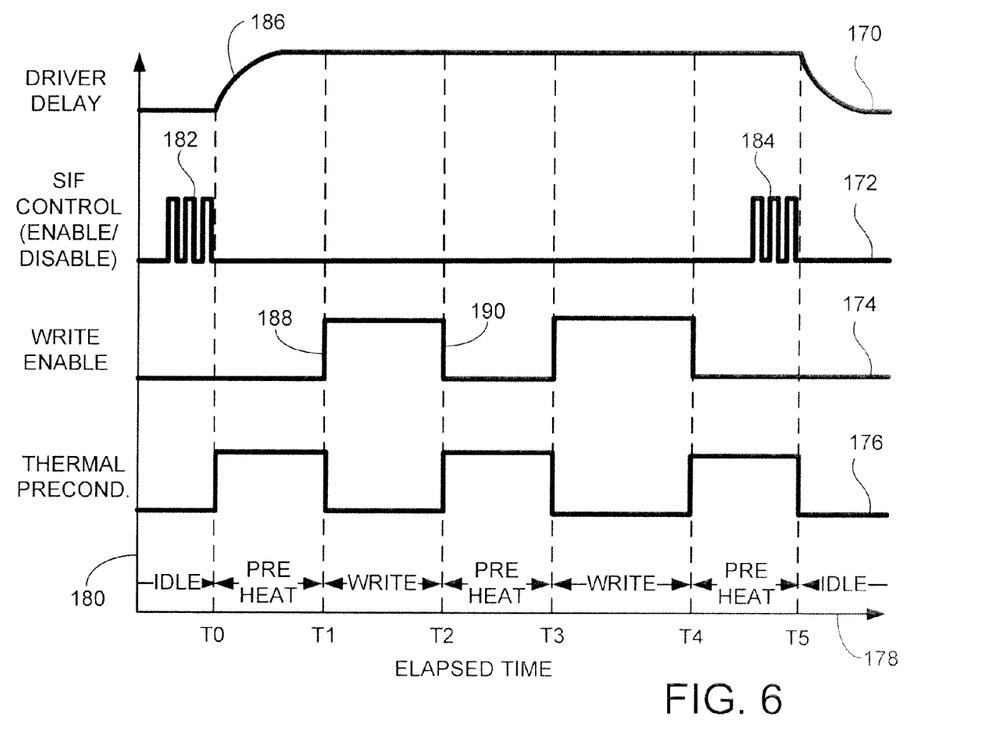
FIG. 6 is a timing diagram illustrative of write delay compensation that may be applied in accordance with some embodiments.

Accordingly, various embodiments generally operate to stabilize the write delay to a steady-state value prior to writing. This is illustrated by FIG. 6, which show a driver delay curve 170, a serial interface (SIF) control curve 172, a write enable curve 174 and a thermal preconditioning curve 176. The curves 170-176 are plotted against an elapsed time x-axis 178 and a common amplitude y-axis 180.

As before, the driver delay curve 170 generally represents variations in write delay over time. The write enable curve 174 represents the application of write enable signals for the writing of data by the write element. The SIF control curve 172 represents control signals input to the preamp 110 to activate a thermal preconditioning mode of operation, and the thermal preconditioning curve 176 shows the actual application of thermal preconditioning.

The control signals used to initiate and subsequently suspend thermal preconditioning are respectively represented as serial data control inputs 182, 184. These inputs can be multi-bit data words transmitted to start and stop the thermal preconditioning operation. It will be appreciated that any number of other types and formats of enable/disable signals can be used.

The write delay is transitioned to steady-state (transition segment 186) prior to the first assertion of the write enable gate (rising transition 188 in curve 174). In this way, thermal stability can be achieved prior to the writing of data. Once initiated, the thermal preconditioning effort is applied at such times that the write enable signal is not asserted (e.g., falling transition 190 in curve 174). Conversely the thermal preconditioning effort is temporarily interrupted when the write enable signal is asserted. Other operational modes are contemplated, such as the use of a temperature sensor or other mechanism to determine that the driver delay has reached steady-state, at which point the thermal preconditioning effort is only applied as required during non-write times to maintain the steady-state condition.

Figure 7A:
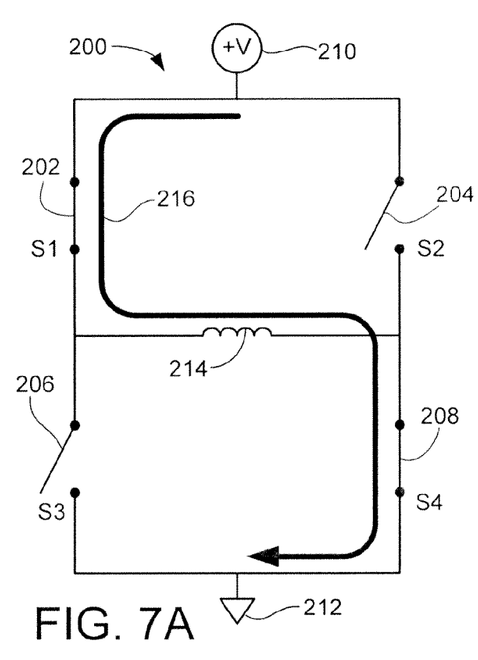
FIGS. 7A-7C depict alternative current paths that may be applied through a write driver such as illustrated in FIG. 2 in accordance with some embodiments.
Figure 7B:
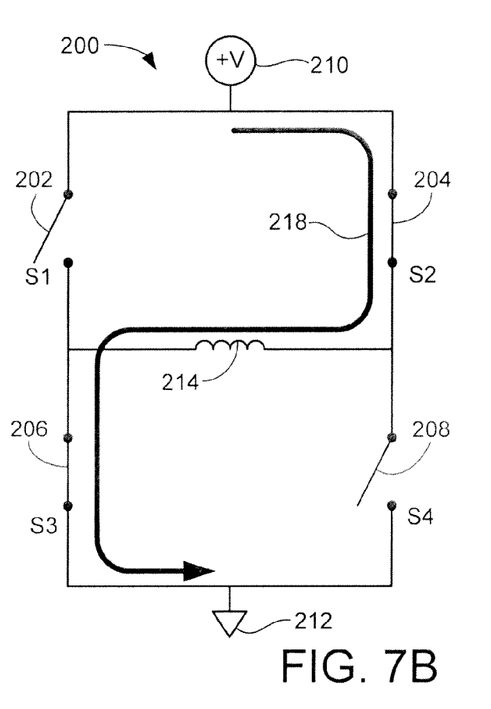
Figure 7C:
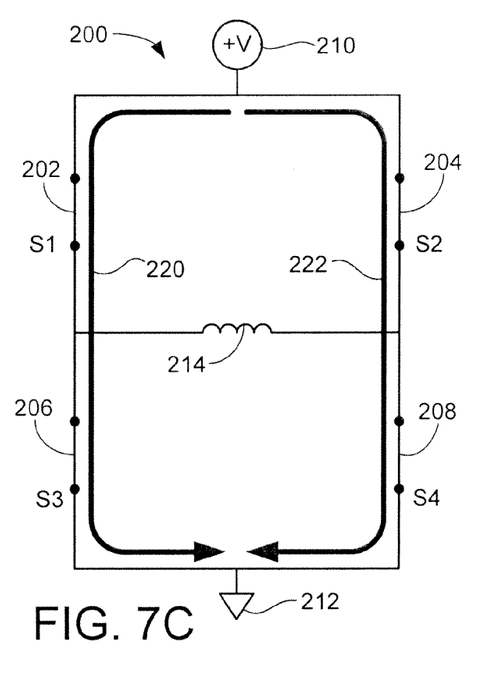

FIGS. 7A-7C provide simplified schematic representations of the write driver circuit 120 of FIG. 2 in accordance with some embodiments. It will be appreciated that additional components can be incorporated into the circuitry as required, and other configurations of drivers can be used. For example, current regulating sinks can be provided to regulate the magnitude of current, etc.

The write driver is characterized as an H-bridge circuit 200, with respective switching devices S1, S2, S3 and S4 (numerically denoted as 202, 204, 206 and 208). The devices S1 and S3 are arranged along one side (leg) of the circuit, and the devices S2 and S4 are arranged along an opposing leg of the circuit. The switching devices may take any number of forms, such as power MOSFETs (metal oxide semiconductor field effect transistors). The MOSFETs are respectively interconnected between a voltage source 210 and a reference line terminal 212. The source 210 and terminal 212 are set to an appropriate voltage differential, such as +5V and −5V respectively. A write coil 214 (generally similar to the write coil 122 in FIG. 2) is coupled between the switches S1/S3 and switches S2/S4 so as to span the respective legs.

FIG. 7A represents a first write current path in which a first write current 216 flows through the coil 214 in a first direction (left to right in FIG. 7A). The first write current is established by placing switches S1 and S4 in a conductive (closed) state and by placing switches S2 and S3 in a non-conductive (open) state. The first write current 216 thus flows from the source 210, through S1, through the coil 214, through S4, and to ground 212.

FIG. 7B shows a second, opposing write current 218. In FIG. 7B, the second write current 218 flows through the coil 214 in an opposing second direction (right to left). The second write current 218 is established by placing switches S2 and S3 in a closed state and placing switches S1 and S4 in an open state. The second write current 218 thus flows from source 210 through S2, coil 214, S3 to ground. The respective bipolar write currents of FIGS. 7A-7B are repetitively applied while the write enable signal (curve 172 in FIG. 6) is asserted to write the associated data to the medium.

FIG. 7C shows the application of thermal conditioning to the circuit 200. In accordance with at least some embodiments, this involves the concurrent parallel application of first and second thermal conditioning currents 220, 222 through the circuit. The respective magnitudes of the currents 220, 222 are nominally equal. In some embodiments, the magnitude of each preconditioning current 220, 222 is nominally half that of each write current 216, 218; that is, the first and second write currents 216, 218 have a magnitude $I_{WRITE}$ and the magnitude of each of the preconditioning currents 220, 222 is set at $I_{TP}=(0.5)I_{WRITE}$. As indicated above, current sources/sinks may be used to regulate the magnitudes of the currents 220, 222. This current limiting function may be established by separate components, or into the operation of the switches S1-S4.

Half-magnitude preconditioning currents as shown in FIG. 7C are suitable since this is nominally equivalent to the current loading of the switches S1-S4 during normal write operation assuming approximately 50% average duty cycle. In this way, the switching devices S1-S4 effectively see nominally the same average current, and hence achieve nominally the same operational temperature, as from the regular write currents.

A current magnitude value slightly greater than or less than 50% of normal may be used to account for various factors such as non-zero activation time and non-linear response. Other values for the preconditioning currents can be used as well, such as $I_{TP}=(0.25)I_{WRITE}$ or $I_{TP}=(0.75)I_{WRITE}$, etc.

Higher magnitude preconditioning currents would generally tend to speed up the thermal stabilization, albeit with potentially higher power consumption and the risk of stress on the system.

Because the thermal preconditioning currents 220, 222 in FIG. 7C are nominally equal to each other, there will be essentially no differential voltage across the coil 214, and no net current will flow through the coil. This advantageously allows the thermal preconditioning currents to be applied at any appropriate non-writing time without risk of overwriting existing data on the medium. Switching between the respective write currents of FIGS. 7A-7B and the preconditioning currents of FIG. 7C can be easily implemented by changing the S1-S4 switch configurations and current magnitudes responsive to assertion/deassertion status of the write enable signal.

Figures 8, 9:
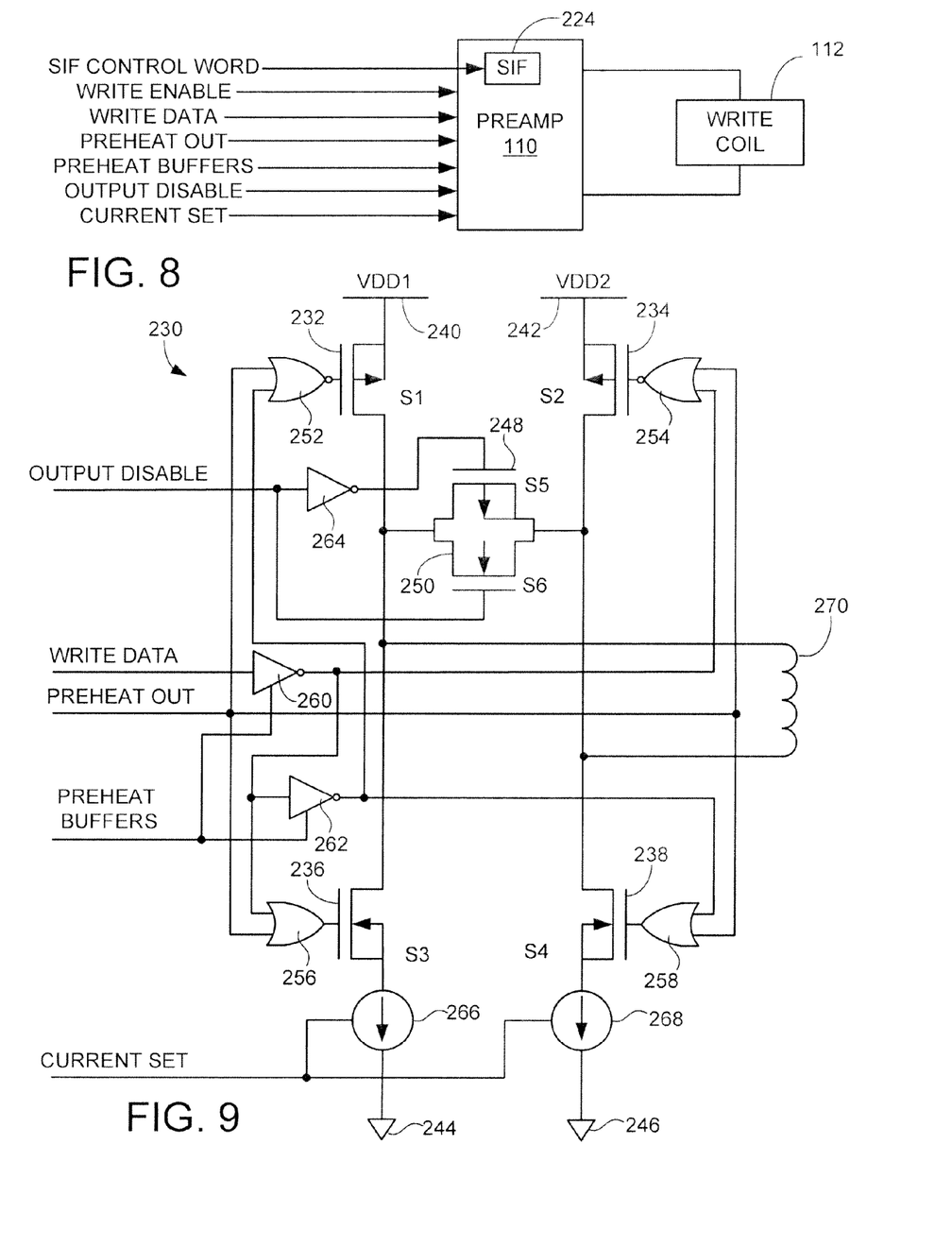
FIG. 8 depicts a preamplifier/driver (preamp) configured in accordance with some embodiments.
FIG. 9 is a schematic diagram for an exemplary configuration for the preamp of FIG. 8.

A number of control inputs can be supplied to or otherwise generated by the preamp 110 to establish the various write currents and thermal preconditioning currents of FIGS. 7A-7C. FIG. 8 shows the application of an SIF control word which is written to an SIF register 224 of the preamp 110. The SIF control word can be generated by the controller 102 (FIG. 1) or other circuitry of the device 100. In some embodiments, the control word is written responsive to the presence of cached writeback data in the I/F buffer. In further embodiments, the control word is written once the associated write command for the cached writeback data is selected for execution from a command queue in controller memory. The thermal preconditioning mode of operation is initiated far enough in advance to ensure that the driver circuit 200 achieves steady-state delay conditions by the time the actual writing of data commences.

The controller 102 may maintain the write driver in thermal preconditioning mode until no further write data are cached in the buffer, after which point the controller can write the appropriate control word to the SIF register 224 to discontinue further application of the preconditioning currents 220, 222. In alternative embodiments, a timer may be used to provide a timeout condition so that no further preconditioning currents are applied after a selected time interval. In further embodiments, a temperature sensor or other mechanism may be used to discontinue further application of preconditioning currents.

Further preamp control inputs shown in FIG. 8 include a write enable signal and a write data signal. These signals may be supplied by the controller 102 or the R/W circuit 108. The write enable signal can be asserted as discussed above to respectively enable the writing of data. The write data signal can represent NRZI data or other data that, when processed by the preamp, results in the successive application of the first and second write currents 216, 218 to write the data to the medium in the desired sequence.

FIG. 8 further shows a preheat out signal, a preheat buffers signal, an output disable signal and a current magnitude set signal. These signals are specifically generated and used during the thermal preconditioning effort. It is contemplated that these signals may be generated internally by the preamp 110 responsive to the writing of the control word to the SIF register 224, although these signals can instead be externally supplied such as by the controller, the R/W channel 108 or other circuitry. It will be appreciated that other signals may be supplied to the preamp as well, such as head selection signals, gain values, etc.

To reduce the number of inputs to the preamp, the preheat out signal may be configured as the AND of the inverse of the write enable signal and the preamp thermal preconditioning enable register value. The output disable and preheat buffers signals may simply be provided from the preheat out signal line. These and other alternative configurations can be readily implemented by the skilled artisan from the disclosed schematic, provided sufficient timing sequence constraints are enforced to avoid undesirable transient states.

FIG. 9 provides a schematic depiction of preamp circuitry 230 configured in accordance with some embodiments. The circuitry 230 in FIG. 9 includes MOSFET switching devices S1-S4 (232, 234, 236, 238); a pair of voltage sources 240, 242; reference line terminals 244, 246; bypass switching devices S5-S6 (248, 250); NOR gates 252, 254; OR gates 256, 258; inverting data buffers 260, 262 and 264; and current limiters (sources) 266, 268.

The switching devices S1-S4 are connected to a write coil 270 in an H-bridge configuration. Switching devices S1, S2 and S5 are characterized as p-channel MOSFETs, and switching devices S3, S4 and S6 are characterized as n-channel MOSFETs. Other configurations can be used.

The voltage sources 240, 242 output respective voltages VDD1 and VDD2 suitable for use in driving the coil 270. These sources may be realized as a single source, or as multiple sources. The current sources 266, 268 serve to regulate the magnitude of current flowing through the H-bridge during both data writes and thermal preconditioning and may be disposed in any suitable location.

During a data write operation, bipolar write currents are passed through the write coil 270 by switching devices S1-S4 in a manner generally similar to that discussed above in FIGS. 7A-7B. To write a sequence of data, the data are serialized as a bit sequence and each rite data bit (logic 0 or 1) is input in turn to the buffer 260, which is characterized as a first write buffer. The output of the buffer 260 sets the respective states (conductive or non-conductive) of switches S1-S4 via secondary data buffer 262, NOR gates 252, 254 and OR gates 256, 258 so that the switch pairs S1/S4 and S2/S3 are operated in tandem responsive to the value of the input bit. Bipolar write currents flow through the coil 270 responsive to the clocking of new bit values into the data buffer 260. The magnitudes of the write currents are regulated by the current sinks 266, 268 responsive to the current magnitude set signal (see FIG. 8).

Thermal preconditioning currents are applied responsive to the SIF control register status and the write enable signal being in a deasserted condition. The output disable signal is normally low (logic 0), but is set high (logic 1) during thermal preconditioning. The output disable signal is input to the buffer 264, which places both switches S5 and S6 into a conductive state, thereby forming a bypass path (shunt) across the coil 270. While not required, this can further ensure that the write coil is shorted out and does not inadvertently write data to the medium. This use of a bypass path further allows the use of non-equal magnitude parallel currents, and allows the sequencing of currents along each leg of the I-bridge in turn as desired.

The preheat out signal from FIG. 8 is also normally low (logic 0), but is set high (logic 1) during thermal preconditioning. This low state places all four switches S1-S4 in a conductive state via NOR gates 252, 254 and OR gates 256, 258. This causes parallel preconditioning currents to flow down the sides of the H-bridge as described previously. The current magnitude set signal sets the preconditioning current magnitudes to the desired level.

Finally, as desired, a preheat buffer signal can be asserted to thermally precondition the respective data buffers 260 and 262. This can enable the data buffers to achieve thermal stability by statically or dynamically passing current through the transistors within these buffers. Since the driver outputs are operationally disabled during the thermal preconditioning operation, pseudo random data can be additionally or alternatively sent via the write data line to the data buffers 260, 262 to further stabilize the delay.

Figure 10:
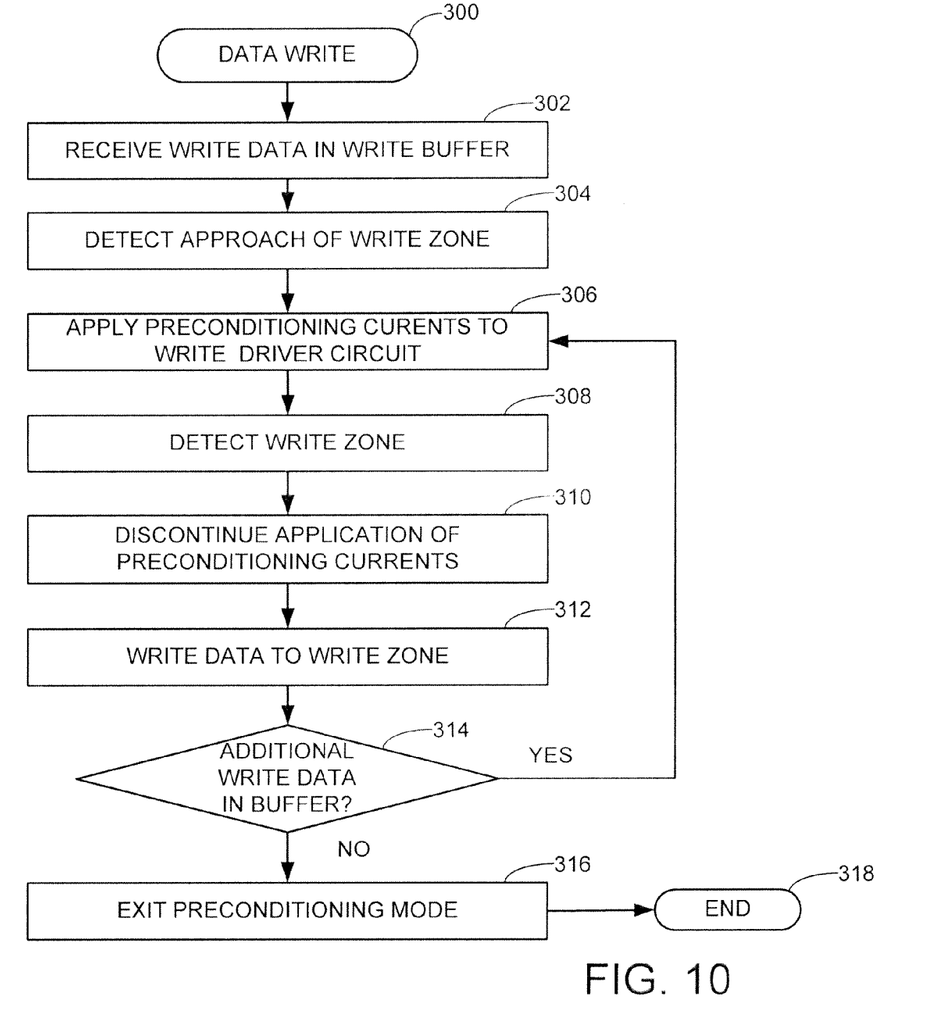
FIG. 10 is a flow chart for a DATA WRITE routine illustrative of steps that may be carried out in accordance with various embodiments.

FIG. 10 is a flow chart for a DATA WRITE routine 300, generally illustrative of steps carried out in accordance with the various foregoing embodiments. During this exemplary routine 300, write data to be written to a medium are received from a host or other source and stored in a write buffer or other suitable memory location pending transfer to the medium. Further operations during step 302 may include placing an associated write command in a command queue in a suitable memory location, and selecting the write command for execution to write the cached write data at an appropriate time. Depending on the configuration of the data storage device, step 302 may further include the selection of the associated transducer/media interface, and a seek operation to position the associated transducer proximate the track having the target data sector(s) (the "write zone") to which the data are to be written.

Step 304 indicates a detection of the approaching write zone proximate the transducer. This can be carried out in a number of ways depending on system latency response and the time required to stabilize the write delay. For example, with reference again to FIG. 4, decoding of the control information from a selected control data field such as the nearest index field, header field, etc. uptrack of the target sector(s) may signal the approach of the write zone. In other embodiments, the selection of the write command for execution, or the arrival of the transducer onto the target track, may serve as the indication of the pending approach of the write zone.

At step 306, thermal preconditioning mode is initiated, such as by the provision of an appropriate control word to the preamp SIF register or via some other mechanism. This results in the application of parallel unipolar currents through a write driver circuit as discussed above. Various preconditioning control signals may be generated as discussed in FIG. 9.

These preconditioning currents continue to be applied until the transducer is positioned adjacent the write zone, step 308, after which the preconditioning currents are discontinued, step 310, and bipolar write currents are applied to write the data to the write zone, step 312. It is contemplated that the write event will occur while the write driver is in a steady state so that variations in write delay from input buffer (e.g. buffer 260) to write core (e.g., core 124) are minimized.

Decision step 314 determines whether additional write data is pending in the buffer, thereby signifying that further write operations may occur in the near future. If so, the routine returns to step 306 wherein preconditioning currents are again supplied to the write driver.

At such time that no further write data are buffered, the routine passes from decision step 314 to step 316 where the device exits the preconditioning mode, and the routine ends at step 318. The preconditioning mode can be exited in a variety of ways as discussed above, including but not limited to by writing an appropriate control word to the SIF register so that further preconditioning control signals are not issued to the write driver.

Figure 11:
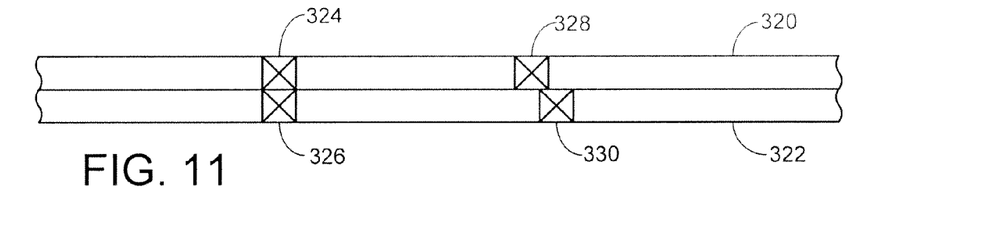
FIG. 11 shows data recorded in accordance with two dimensional (2D) recording techniques.

Additional applications in which the various embodiments disclosed herein may be found useful include shingled recording and two dimensional (2D) recording. Shingled recording generally refers to the use of overlapping tracks, so that an earlier written first track is subsequently partially overwritten (trimmed) by a later written second track. 2D recording, also sometimes referred to as two dimensional magnetic recording (TDMR), generally involves the writing of data across multiple adjacent tracks FIG. 11 represents the use of two dimensional magnetic recording (TDMR) to write data along multiple tracks. While just two tracks 320, 322 are shown, it will be appreciated that this can be extended to any number of tracks to provide a 2D set. A first physically recorded bit 324 is shown on track 320, and an adjacent second physically recorded bit 326 is shown on track 322. As the first bit 324 can take a value of either 0 or 1, and the second bit 326 can take a value of either 0 or 1, this provides a total of four separate states ($2^2$) that can be represented by the combination of bits: 00, 01, 10 and 11. Thus, by reading the respective bits 324 and 326, either concurrently or during separate rotations, the overall data value represented by the combination of bits can be determined.

The use of three bits on three tracks would provide a total of eight ($2^3$) separate states for the combination of three bits, and so on. While the bits 324, 326 are shown to be synchronized (e.g., angularly aligned), such is not necessarily required; the bits may be angularly offset by some controlled amount along the respective tracks so long as the relative locations of the bits are accurately controlled so as to be in the appropriate relative locations.

A third physically written bit 328 is shown on track 320, and a fourth physically written bit 330 is shown on track 322. These bits 328, 330 are intended to represent a synchronized bit combination using 2D recording in the manner similar to bits 324, 326. As can be seen, however, bit 330 is shifted relative to bit 328. Such undesired displacements can arise due to the variations in write delay during the separate writing of the respective bits 328, 330. Thus, the various embodiments discussed above can further be used in shingling and 2D recording applications to ensure correct bit placement.

While the various embodiments presented herein are particularly suitable for BPM applications, such is merely illustrative and not limiting. For example, a medium having a contiguous recording layer can readily be used, the contiguous recording layer being considered as providing a number of available contiguous memory cells to receive data. As noted above, the techniques disclosed herein are also suitable for use in 2D recording and shingled recording applications. It will be noted that in BPM recording, accurate phase timing control is required with respect to the medium, whereas in 2D recording accurate phase timing control is required with respect to previously written data.

Any number of different types of data recording systems can be used, including HAMR, optical and magneto-optical recording systems. Other forms of data storage devices can be used as well, including data storage devices that do not utilize a moveable data transducer adjacent a rotatable data storage medium. Examples of the latter include systems that store data in memory cells of a solid-state array, including magnetic random access memory (MRAM), spin torque transfer random access memory (STRAM), phase change random access memory (PCRAM), flash memories, etc.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
    a write driver adapted to output bipolar write currents to write data to a memory; and
    a preconditioning circuit adapted to output first and second thermal preconditioning currents along non-overlapping paths through the write driver to stabilize a write delay associated with the write driver to a steady-state level prior to the writing of data to the memory.

2. The apparatus of claim 1, in which the write driver is coupled to a write coil which generates magnetic fields responsive to the bipolar write currents, the magnetic fields adapted to set a sequence of magnetically responsive data storage cells in the memory to a desired magnetic orientation.

3. The apparatus of claim 1, in which the memory is characterized as a rotatable storage medium to which data are written by a moveable data transducer coupled to the write driver.

4. The apparatus of claim 3, in which storage medium is characterized as a bit patterned medium (BPM).

5. The apparatus of claim 1, further comprising a data transducer comprising a write element and a read element, the write element coupled to the write driver to transduce data to a rotatable data storage medium responsive to the bipolar write currents, the preconditioning circuit initiating the output of the thermal preconditioning currents responsive to detection of control data from the data storage medium by the read element.

6. The apparatus of claim 1, in which the write driver takes an H-bridge configuration with first, second, third and fourth switching devices and an intervening write element connected therebetween, the bipolar write currents passing in opposing directions through the write element, and the thermal conditioning currents passing in parallel through respective pairs of the switching devices without passing through the intervening write element.

7. The apparatus of claim 6, further comprising a switchable bypass path in parallel with the write element to shunt current around the coil during the application of the thermal conditioning currents.

8. The apparatus of claim 6, further comprising an input data buffer coupled to a gate structure of each of the first, second, third and fourth switching devices to establish the bipolar write currents responsive to a storage state of a data bit within the data buffer, wherein a third thermal conditioning current is applied to the input data buffer during application of the first and second thermal conditioning currents.

9. The apparatus of claim 1, in which the magnitudes of the first and second thermal preconditioning currents are nominally equal to each other and nominally half the magnitudes of the bipolar write currents.

10. The apparatus of claim 1, further comprising a write buffer, wherein the preconditioning circuit applies the thermal conditioning currents to the write driver responsive to a detection of write data in the write buffer by a controller, the write data pending transfer by the write driver to the memory.

11. The apparatus of claim 1, in which the media stores data in a two dimensional (2D) recording format and the stabilization of the write delay angularly aligns data bits written to at least two adjacent tracks on the medium.

12. An apparatus comprising:
    a driver circuit adapted to apply write currents to a write element to write data to an adjacent data storage medium, the driver circuit comprising:
        a write driver adapted to output bipolar first and second write currents to the write element to write the data responsive to a first input signal; and a preconditioning circuit adapted to output parallel first and second thermal preconditioning currents that do not pass through the write element, but do pass through the write driver, to stabilize a write delay of the write driver prior to the writing responsive to a second input signal.

13. The apparatus of claim 12, in which the write driver takes an H-bridge configuration with first, second, third and fourth switching devices, the first and fourth switching devices being connected in series along a first leg and the second and third switching devices being connected in series along a second leg, wherein the write element is connected between the first and second legs, the bipolar write currents passing in opposing directions through the write element, and the parallel thermal conditioning currents passing along the respective legs without passing through the intervening write element.

14. The apparatus of claim 13, in which the write driver further comprises a fifth switching device connected between the first and second legs in parallel with the write element, the fifth switching device placed in a non-conductive state during passage of the bipolar write currents and placed in a conductive state during passage of the parallel thermal conditioning currents responsive to a third input signal.

15. The apparatus of claim 12, in which the driver circuit further comprises a register, wherein the preconditioning circuit outputs the thermal preconditioning currents responsive to a control word written to the register.

16. A method comprising:
  detecting a presence of pending write data in a buffer memory;
  applying first and second thermal preconditioning currents to a write driver to stabilize a write delay associated with the write driver to a steady-state level responsive to the detection of the presence of the pending write data; and
  subsequently using the stabilized write driver to apply bipolar first and second write currents to a write element to write the pending write data to a memory.

17. The method of claim 16, further comprising using a read element to identify a proximity of the write element to a write zone of the memory to which the pending write data are to be written, wherein the applying step is performed responsive to the identification by the read element.

18. The method of claim 16, in which the memory is characterized as a bit patterned media comprising an array of discrete bit cells each adapted to magnetically store a data bit responsive to the write element, the applying step increasing the write delay of the write driver to a steady-state level prior to the writing of data to a selected number of the bit cells.

19. The method of claim 16, wherein the applying step is further carried out responsive to a selected control word being written to a register by a controller.

20. The method of claim 16, in which the write driver takes an H-bridge configuration with first, second, third and fourth switching devices, the first and fourth switching devices being connected in series along a first leg and the second and third switching devices being connected in series along a second leg, wherein an intervening write element is connected between the first and second legs, the bipolar write currents passing in opposing directions through the write element, and the parallel thermal conditioning currents passing along the respective legs without passing through the intervening write element.

* * * * *